UNITED STATES PATENT OFFICE

HERMANN WAGNER, OF BAD-SODEN-ON-THE-TAUNUS, RUDOLF BRUNE, OF HOCHST-ON-THE-MAIN, MAX HESSENLAND, OF KONIGSBERG, AND ERWIN HOFFA, FRITZ MÜLLER, AND HANS HEYNA, OF HOCHST-ON-THE-MAIN, GERMANY, ASSIGNORS TO GENERAL ANILINE WORKS, INC., OF NEW YORK, N. Y., A CORPORATION OF DELAWARE

VAT DYESTUFF

No Drawing. Original application filed May 3, 1926, Serial No. 106,492, and in Germany May 6, 1925. Divided and this application filed August 30, 1928. Serial No. 303,102.

Our present invention relates to vat dyestuffs, more particularly to vat dyestuffs of the following general formula:

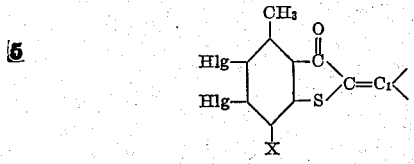

wherein $C_1$ represents a carbon atom belonging to the five-membered nucleus of a thionaphthene compound and X represents hydrogen which may be replaced by halogen, in which formula the right side is different from the left side.

We have found that the condensation products obtained from a 4-methyl-5.6 dihalogenhydroxythionaphthene or a derivative thereof—particularly an α-derivative and compounds capable of coupling with a hydroxythionaphthene or an α-derivative thereof—possess eminently good properties as to fastness, in particular great fastness to light and kier-boiling.

Instead of using as starting material a 4-methyl-5.6-dihalogenhydroxythionaphthene there may also be used as such a 3-methyl-4.5-dihalogen-1-thioglycol-2-carboxylic acid, provided that the latter is transformed by the existing conditions of the reaction into the corresponding hydroxythionaphthene or a reactive derivative thereof.

The properties of the dyestuffs obtainable by the present process may be considerably improved by further halogenating them in the usual manner. The color of the dyestuffs is thereby not only changed to the desired blue tint, but their fastness to kier-boiling is also enhanced.

The following example illustrates our invention, the parts being by weight:

24 parts of 4-methyl-5.6-dichloro-3-hydroxythionaphthene are dissolved in alcohol and an alkali and mixed with an alcoholic solution of 25 parts of 4-nitrosodimethylaniline. After having stirred the mass for a short time, the 4-methyl-5.6-dichloro-2-3-dihydro-3-ketothionaphthene-2-(4'-dimethylamino)-anil separates completely. It is filtered by suction and boiled for several hours together with 28 parts of 4-bromo-3.2-(3'-hydroxy-1'-thiophene) naphthalene:

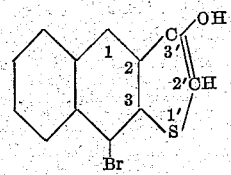

and 400 parts of glacial acetic acid. After cooling the resulting mass is filtered off by suction and washed.

The dyestuff thus obtained is a dark violet powder; it dissolves in nitro benzene to a bluish-red solution with a violet fluorescence and yields a yellowish-red vat dyeing cotton violet tints of particularly good properties as to fastness. It has the formula:

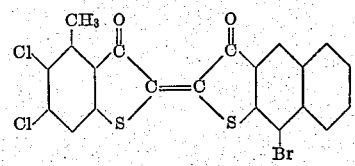

This application is a division of our copending U. S. application Ser. No. 106,492 filed May 3, 1926.

We claim:

1. As new products the vat dyestuffs of the general formula:

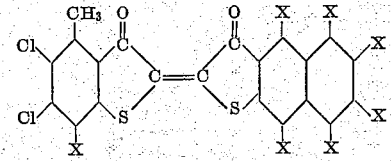

wherein X represents hydrogen which may be replaced by halogen.

2. As new products, the vat dyestuffs of the general formula:

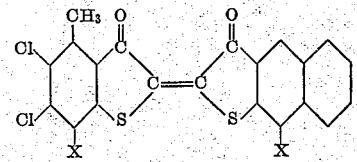

wherein X represents hydrogen which may be replaced by halogen.

3. As a new product, the vat dyestuff of the formula:

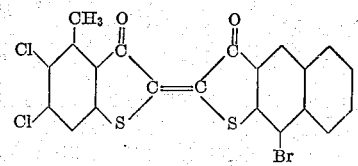

being a dark violet powder, dissolving in nitrobenzene to a bluish-red solution with a violet fluorescence and yielding a yellowish-red vat, from which cotton is dyed violet tints of particularly good properties as to fastness.

In testimony whereof, we affix our signatures.

HERMANN WAGNER.
RUDOLF BRUNE.
MAX HESSENLAND.
ERWIN HOFFA.
FRITZ MÜLLER.
HANS HEYNA.